US012676441B2

(12) United States Patent
Kremenetsky et al.

(10) Patent No.: US 12,676,441 B2
(45) Date of Patent: Jul. 7, 2026

(54) RECEPTACLE CAGE WITH INTEGRATED PLATE FOR LIMITING THE FLOW OF AIR THROUGH THE INTERIOR OF THE RECEPTACLE CAGE

(71) Applicant: Mellanox Technologies, Ltd., Yokneam (IL)

(72) Inventors: Alex Kremenetsky, Yokneam (IL); Andrey Ger, Yokneam (IL); Ron Hartston, Yokneam (IL)

(73) Assignee: Mellanox Technologies Ltd., Yokneam (IL)

( * ) Notice: Subject to any disclaimer, the term of this patent is extended or adjusted under 35 U.S.C. 154(b) by 533 days.

(21) Appl. No.: 18/105,917

(22) Filed: Feb. 6, 2023

(65) Prior Publication Data

US 2024/0178606 A1 May 30, 2024

Related U.S. Application Data

(60) Provisional application No. 63/428,759, filed on Nov. 30, 2022.

(51) Int. Cl.
*H01R 13/516* (2006.01)
*H01R 13/518* (2006.01)

(52) U.S. Cl.
CPC ......... *H01R 13/516* (2013.01); *H01R 13/518* (2013.01); *H01R 2201/04* (2013.01)

(58) Field of Classification Search
CPC H01R 13/516; H01R 13/518; H01R 2201/04; H01R 13/6594; H01R 13/6583
See application file for complete search history.

(56) References Cited

U.S. PATENT DOCUMENTS 2,736,984 A * 3/1956 Deane .................... A01M 23/08 43/61
6,042,348 A * 3/2000 Aakalu ................ H05K 7/2019 417/427
6,607,308 B2 * 8/2003 Dair ...................... G02B 6/4277 385/92
7,222,043 B2 * 5/2007 Augustin ........... G01R 31/2862 73/75
7,821,774 B2 * 10/2010 Josten .................. H02B 13/025 361/601
9,583,886 B2 * 2/2017 Phillips ................ H01R 13/516
2002/0025720 A1 * 2/2002 Bright .................. G02B 6/4246 439/541.5
2003/0141090 A1 * 7/2003 Kruger ................. H05K 9/0058 174/50
2004/0037034 A1 * 2/2004 Suzuki ................. G11B 33/126
2005/0162831 A1 * 7/2005 Shum ................. H05K 7/20581 361/695
2005/0164545 A1 * 7/2005 Rosenthal ............ H01R 25/003 439/501
2006/0039108 A1 * 2/2006 Chikusa .................... G06F 1/20
(Continued)

*Primary Examiner* — Truc T Nguyen
(74) *Attorney, Agent, or Firm* — PEARL COHEN ZEDEK LATZER BARATZ LLP

(57) ABSTRACT

A receptacle cage which may include: a frame including: a first frame end, a second frame end, a frame interior, a first frame surface and a second frame surface opposed to the first frame surface; and a plate projecting from the first frame surface into the frame interior towards the second frame surface.

17 Claims, 6 Drawing Sheets

PARTIAL LONGITUDINAL SECTIONAL VIEW

(56) References Cited

U.S. PATENT DOCUMENTS

| | | | | |
|---|---|---|---|---|
| 2006/0218849 | A1* | 10/2006 | Rich | A01M 23/18<br>43/61 |
| 2007/0159791 | A1* | 7/2007 | Pongracz | H05K 7/20145<br>361/688 |
| 2010/0151733 | A1* | 6/2010 | Tsou | H01R 13/6594<br>439/607.55 |
| 2010/0172093 | A1* | 7/2010 | Davis | H05K 7/20736<br>361/694 |
| 2011/0085300 | A1* | 4/2011 | Sivanandan | H05K 7/20172<br>312/213 |
| 2013/0199835 | A1* | 8/2013 | Janota | H05K 9/0083<br>174/378 |
| 2014/0211423 | A1* | 7/2014 | Nguyen | H05K 7/1409<br>361/728 |
| 2018/0368283 | A1* | 12/2018 | Little | H01R 13/6581 |
| 2021/0226361 | A1* | 7/2021 | Mason | H01R 13/6471 |
| 2022/0344874 | A1* | 10/2022 | Yang | H01R 13/6581 |

* cited by examiner

PARTIAL LONGITUDINAL SECTIONAL VIEW

100

PARTIAL LONGITUDINAL SECTIONAL VIEW

RECEPTACLE CAGE WITH INTEGRATED PLATE FOR LIMITING THE FLOW OF AIR THROUGH THE INTERIOR OF THE RECEPTACLE CAGE

CROSS REFERENCE TO RELATED APPLICATIONS

This application claims the benefit of U.S. Provisional Patent Application No. 63/428,759 filed on Nov. 30, 2022, which is hereby incorporated by reference.

FIELD OF THE INVENTION

The present invention relates to the field of electronic (e.g. network) devices, and more particularly, to devices for limiting flow of air through receptacle cages of network devices.

BACKGROUND OF THE INVENTION

Electronic devices may be inserted in housings that enable cooling. For example, a network device, e.g., network switch device, may include a plurality of housings such as receptacle cages configured to receive computer network interface devices, e.g., small form-factor pluggable (SFP) devices. In order to remove heat generated by network interface devices operating within the receptacle cages of the network device, air is circulated through the receptacle cages (e.g., through gaps between longitudinal fins of heat sinks of the network interface devices). Empty receptacle cages that are not occupied by network interface devices are typically covered at their respective open ends with dedicated covers to reduce or limit the flow of air through the unoccupied receptacle cages. Limiting or reducing the flow of air through empty or unoccupied receptacle cages in the operating network device may be important to cause air to pass through all (e.g., occupied and unoccupied) receptacle cages of the network device at the same (or substantially the same) flowrate to ensure that heat generated by the network interface devices operating within the occupied receptacle cages is removed by the flow of air at the same (or substantially the same) desired rate.

SUMMARY OF THE INVENTION

Embodiments of the present invention may provide a container or receptacle cage which may include: a frame comprising: a first frame end, a second frame end, a frame interior, a first frame surface and a second frame surface opposed to the first frame surface, and a plate projecting from the first frame surface into the frame interior towards the second frame surface.

Embodiments of the present invention may provide a receptacle cage which may include: a frame comprising: a first frame end, a second frame end, a frame interior, a first frame surface, a second frame surface opposed to the first frame surface, a third frame surface and a fourth frame surface opposed to the third frame surface; and a plate coupled to the first frame surface and rotatable with respect to the first frame surface about an axis extending between the third frame surface and the fourth frame surface, the plate extending from the first frame surface into the frame interior towards the second frame surface.

Embodiments of the present invention may provide a receptacle cage which may include: a frame comprising: a first frame end, a second frame end, a frame interior, a first frame surface, a second frame surface opposed to the first frame surface, a third frame surface and a fourth frame surface opposed to the third frame surface; a collapsible plate coupled to the first frame surface and extending from the bottom frame surface into the frame interior towards the second frame surface; wherein the collapsible plate collapses towards the first from surface when a force is applied on the collapsible plate in a longitudinal direction extending from the first frame end towards the second frame end and springs back to its initial position when the force is released.

BRIEF DESCRIPTION OF THE DRAWINGS

For a better understanding of embodiments of the invention and to show how the same can be carried into effect, reference is made, purely by way of example, to the accompanying drawings in which like numerals designate corresponding elements or sections throughout.

Figure 1A:
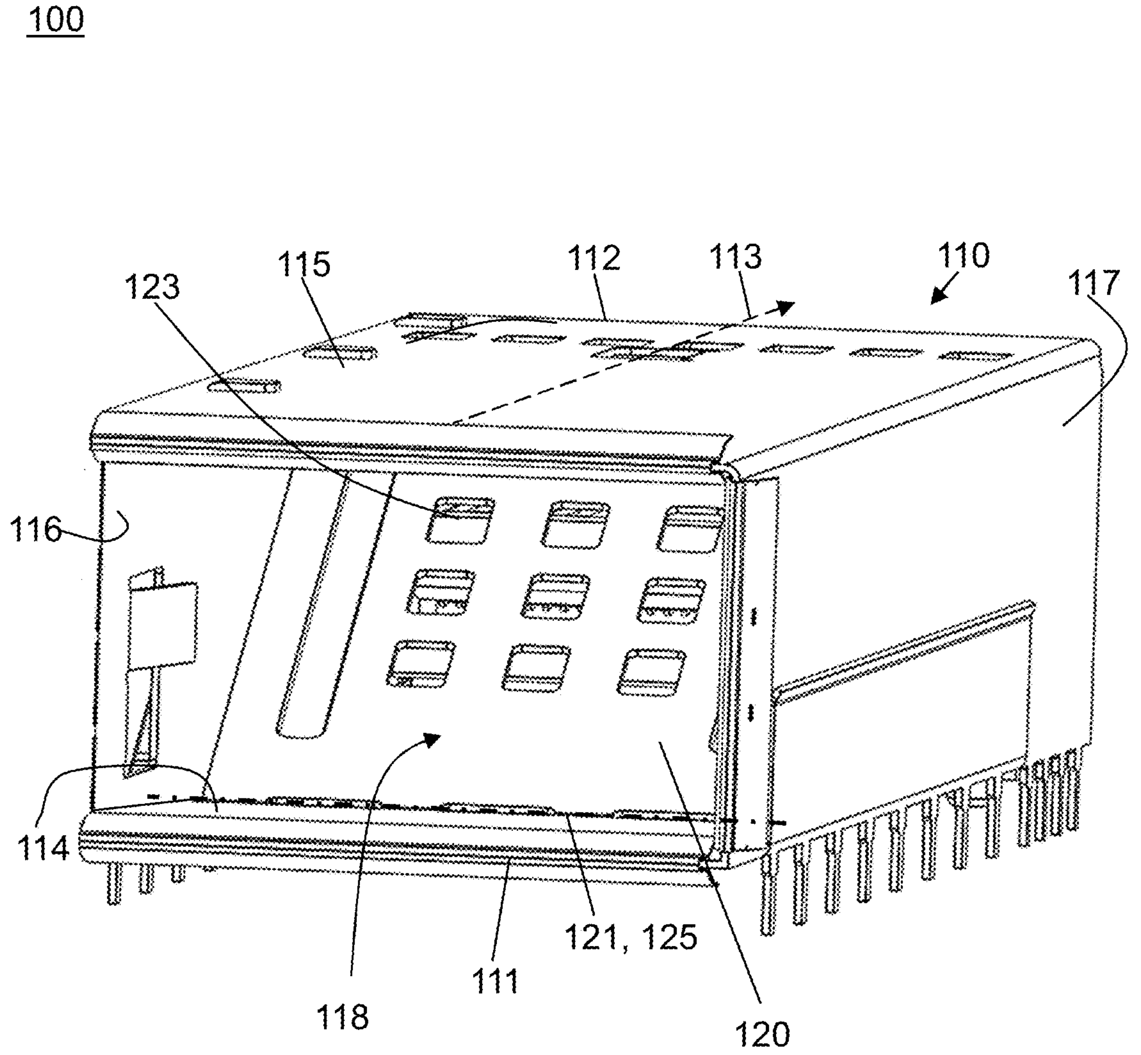
FIGS. 1A, 1B, 1C and 1D are three-dimensional (3D) diagrams of a receptacle cage, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Embodiments of the present invention may improve handling and functionality of housings such as receptacle cages that are not occupied by computer components such as network interface devices, for example in an operating network device such as network switch device. Embodiments of the present invention may be also utilized in devices other than network device.

Embodiments of the present invention may provide a receptacle cage for a network device. The receptacle may include a frame. The frame may include a first frame end, a second frame end, a frame interior, a first frame surface and a second frame surface opposed to the first frame surface. The receptacle cage may include a flap or plate projecting from the first frame surface into the frame interior towards the second frame surface. The first frame surface may be any one of a bottom surface (e.g., a surface that faces a printed circuit board (PCB) of the network device when the receptacle cage is placed on the PCB), a top surface that is opposed to the bottom surface, a first frame surface that is perpendicular (or substantially perpendicular) to the bottom surface and the top surface, or a second lateral surface that is opposed to the first lateral surface of the frame. The plate may be movable or rotatable with respect to the first frame surface about an axis extending between a third frame surface and a fourth frame surface that is opposed to the third frame surface. The plate may collapse towards the first frame surface when a force is applied on the plate in a longitudinal direction extending from the first frame end towards the second frame end and springs back to its initial non-collapsed position when the force is released.

For example, when a computing component such as a network interface device, e.g., such as a small form-factor pluggable (SFP) device, is inserted into the frame interior in the longitudinal direction from the first frame end towards the second frame end, the network interface device may apply a force on the plate and cause the plate to move, rotate or collapse towards the first frame surface. When the network interface device is removed from the frame interior, the plate may be biased or spring back to its initial non-collapsed position. When in the initial non-collapsed position, the plate may resist to the flow of air through the frame interior in the same (or substantially the same) measure as would a network interface device resist if the network interface device would be disposed within the frame interior thereof. When in the initial non-collapsed position, the plate may reduce or limit the flow of air through the frame interior (as compared to the frame interior that is not occupied by a network interface device and has no flow limiting plate) to cause air to flow through the frame interior at the same (or substantially the same) flowrate as would cause a network interface device if the network interface device would be disposed within the frame interior thereof. For example, the plate may include a plurality of holes that allow air to flow through the frame interior when the plate is in the initial non-collapsed position while reducing or limiting the flow of air (as compared to the frame interior that is not occupied with a network interface device and has no flow limiting plate) to cause air to flow through the frame interior at the same (or substantially the same) flowrate as would cause a network interface device if the network interface device would be disposed within the frame interior thereof. Limiting or reducing the flow of air through empty or unoccupied receptacle cages in the operating network device may be important to cause air to pass through all (e.g., occupied and unoccupied) receptacle cages of the network device at the same (or substantially the same) flowrate to ensure that heat generated by the network interface devices operating within the occupied receptacle cages is removed by the flow of air at the same (or substantially the same) desired rate.

Unlike in prior art receptacle cage that needs to be covered at its open end with dedicated cover device when not occupied by a network interface device, the disclosed receptacle cage includes the plate integrated within the frame interior of the receptacle cage to limit or reduce the flow of air through the frame interior of the receptacle cage when the frame interior is not occupied by a network interface device. Embodiments of the present invention eliminate a need in dedicated covers for receptacle cages and thus simplify and improve handling of empty receptacle cages that are not occupied by network interface devices in the operating network device.

Figure 1B:
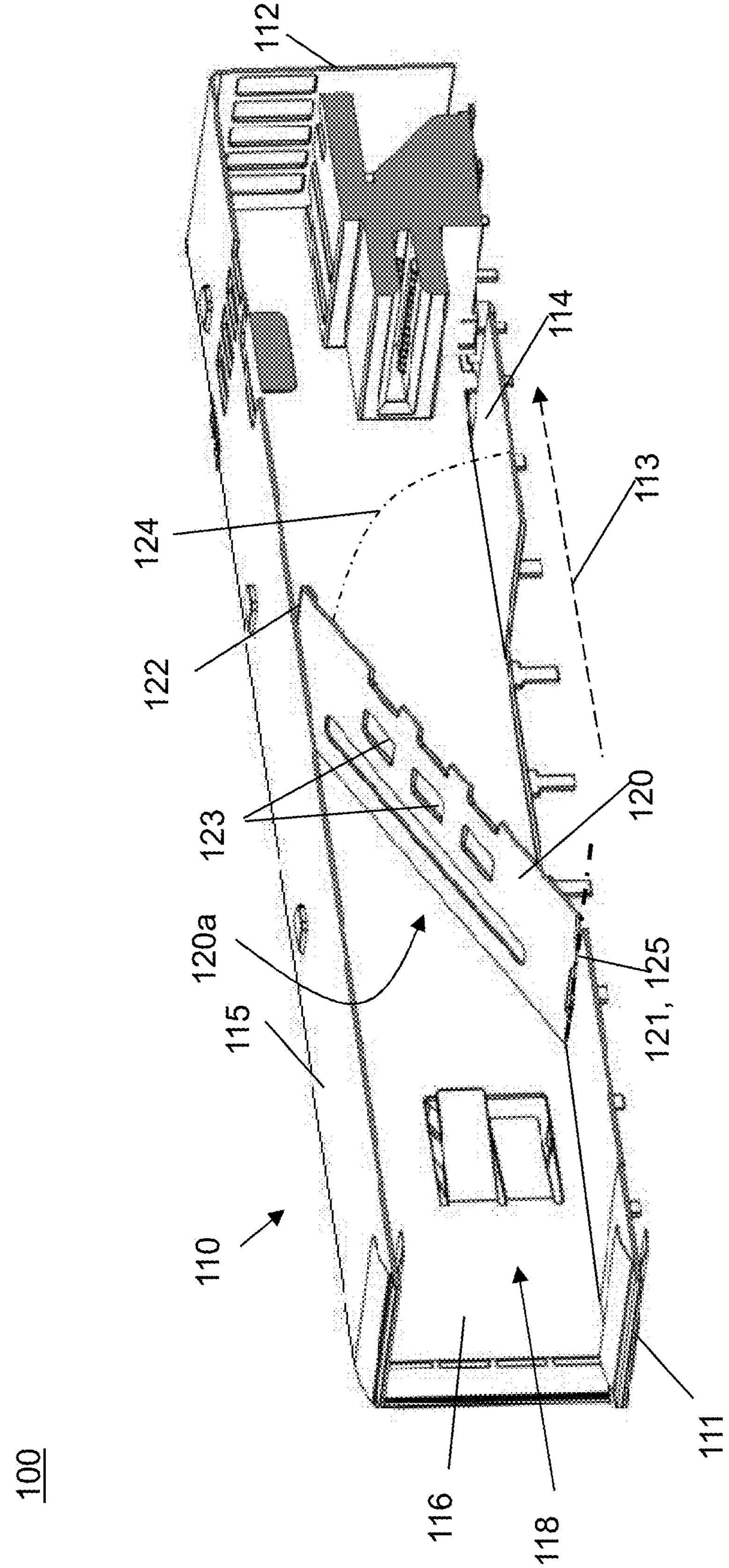
Figure 1C:
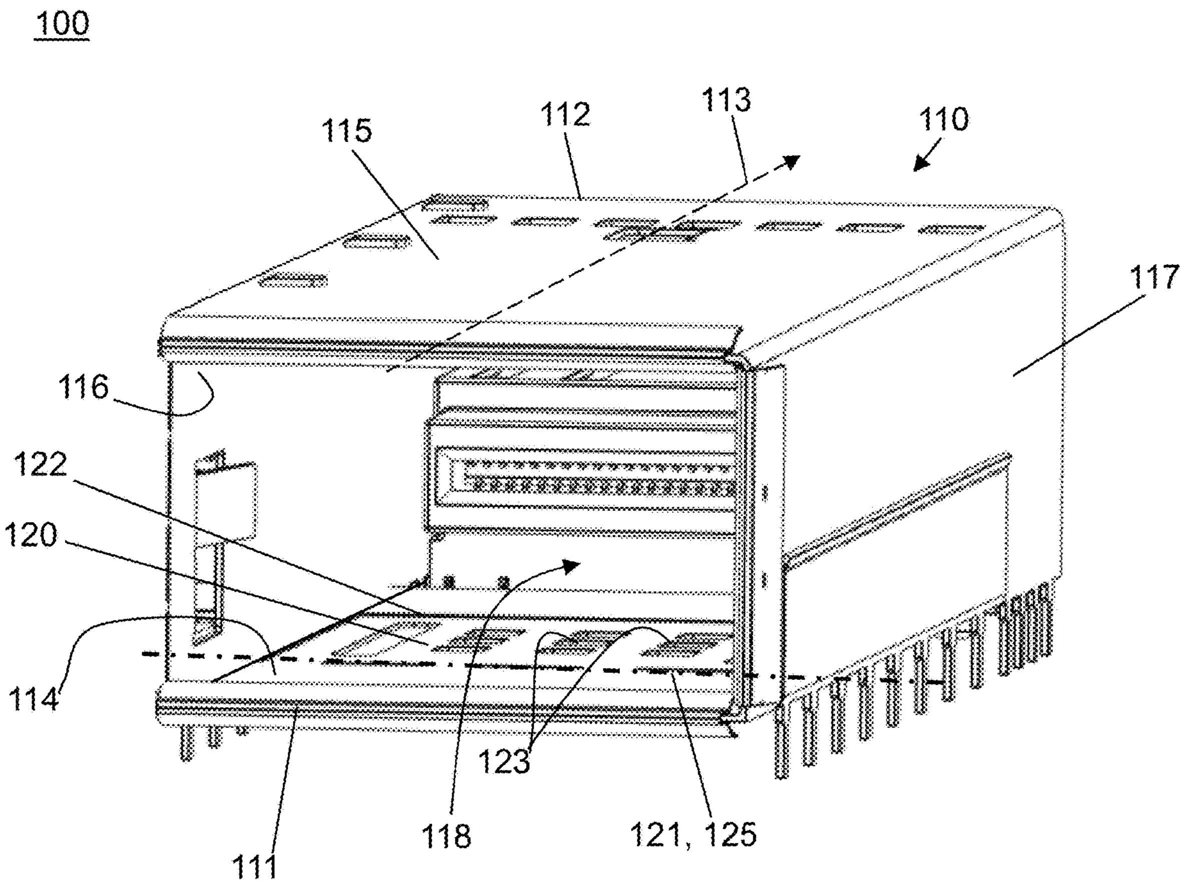
Figure 1D:
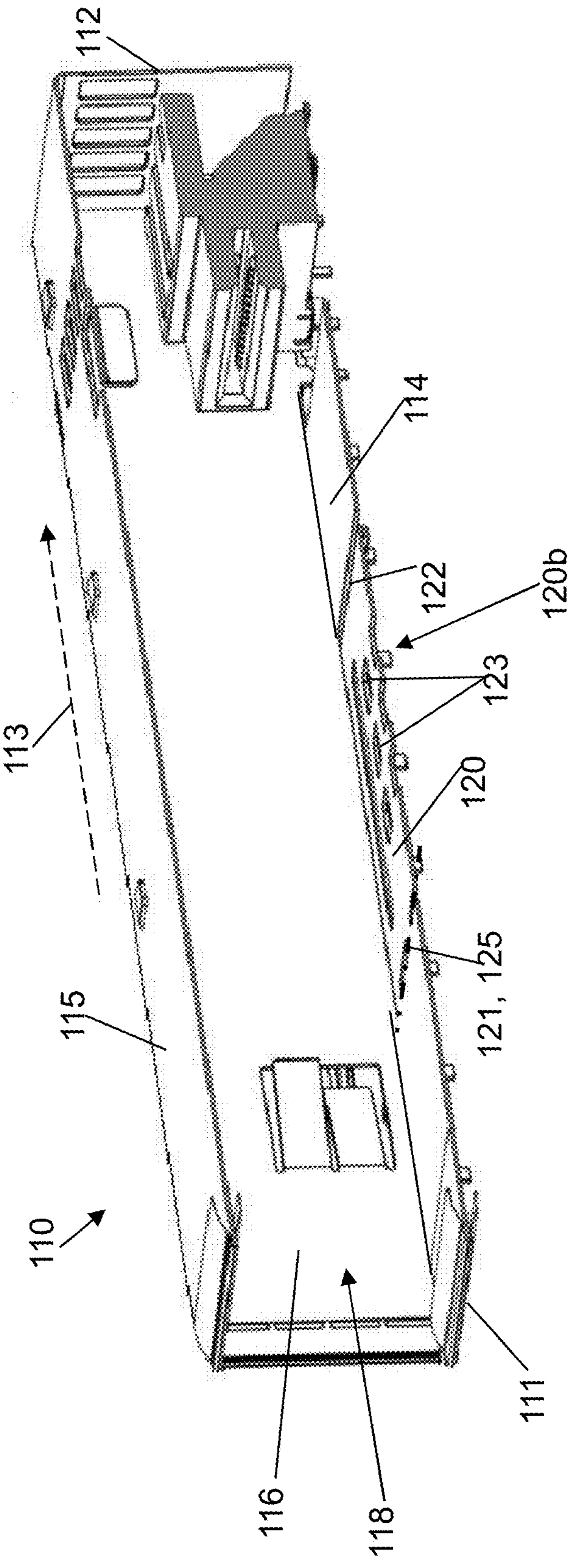

Reference is made to FIGS. 1A, 1B, 1C and 1D, which are 3D diagrams of a receptacle cage 100, according to some embodiments of the invention. FIGS. 1A and 1C show a perspective view of receptacle cage 100. FIGS. 1B and 1D show a partial longitudinal sectional view of receptacle cage 100.

Receptacle cage 100 may include a frame 110 and a flat piece or plate 120 integrated within frame 110 for limiting or reducing the flow of air through frame 110 when frame 110 is not occupied by a network interface device (e.g., as described herein). Plate 120 may be rotatable within frame 110 between an initial non-collapsed position 120*a* (e.g., as shown in FIGS. 1A, 1B) and a collapsed position 120*b* (e.g., as shown in FIGS. 1C, ID).

Frame 110 of a container or receptacle cage 100 may include a first frame end 111, a second frame end 112 and a longitudinal direction 113 extending from first frame end 111 towards second frame end 112. Frame 110 may include a first frame surface 114 and a second frame surface 115 that is opposed to first frame surface 114. First frame surface 114 and second frame surface 115 may be parallel (or substantially parallel) to each other. Frame 110 may include a third frame surface 116 and a fourth frame surface 117 that is opposed to third frame surface 116. Third frame surface 116 and fourth frame surface 117 may be parallel (or substantially parallel) to each other. Each of third frame surface 116 and fourth frame surface 117 may be perpendicular (or substantially perpendicular) to each of first frame surface 114 and second frame surface 115. Frame 110 may include a frame interior 118 formed between first frame surface 114, second frame surface 115, third frame surface 116 and fourth frame surface 117. First frame end 111 may be an open end or may include an opening through which an electronic component such as a network interface device (e.g., small form factor pluggable (SFP) device) may be inserted into frame interior 118.

Plate or door 120 of receptacle cage 100 may be coupled at its base edge 121 to first frame surface 114. Plate 120 may project from first frame surface 114 into frame interior 118 towards second frame surface 115 (e.g., as shown in FIGS. 1A, 1B). First frame surface 114 may be any one of a bottom surface (e.g., a surface that faces a printed circuit board (PCB) of the network device when the receptacle cage is placed on the PCB; e.g., as in the example of FIGS. 1A, 1B, 1C and 1D), a top surface that is opposed to the bottom surface, a first lateral surface that is perpendicular (or substantially perpendicular) to the bottom surface and the top surface, or a second lateral surface that is opposed to the first lateral surface. Plate 120 may extend between third frame surface 116 and fourth frame surface 117. Plate 120 may extend through the entire (or substantially entire) distance between third frame surface 116 and fourth frame surface 117 (e.g., as shown in FIGS. 1A and 1C). Plate 120 may contact, at its free edge 122 (e.g. the edge not connected to another component) that is opposed to base edge 121, second frame surface 115. Plate 120 may include a plurality of openings or holes 123 formed through plate 120. Plate 120 may have a length (measured as a distance between base edge 121 and free edge 122 of plate 120) that is greater than the distance between first frame surface 114 and second frame surface 115. Plate 120 may be inclined at an angle 124 relative to first frame surface 114 in a longitudinal direction 113 extending from first frame end 111 towards second frame end 112. Angle 124 may be, for example, equal or smaller than 90 degrees. For example, angle 124 may have a value of 60, 50, 40, 30 degrees or other suitable value. In the example of FIG. 1B, angle 124 has a value of about 30 degrees.

Plate 120 may be rotatable with respect to first frame surface 114 about an axis 125 extending between third frame surface 116 and fourth frame surface 117. Axis 125 may, for example, coincide with base edge 121 of plate 120 (e.g., as shown in FIGS. 1A, 1B, 1C and 1D). Plate 120 and first frame surface 114 may be formed of one piece of material (e.g., as shown in FIGS. 1A, 1B, 1C and 1D). Plate 120 and first frame surface 114 may be formed of a resilient material. For example, plate 120 and first frame surface 114 may be formed of stainless steel, hardened stainless steel or any other suitable material known in the art. Plate 120 may collapse towards first frame surface 114 when a force is applied on plate 120 in longitudinal direction 113 extending from first frame end 111 towards second frame end 112 (e.g., FIGS. 1C, ID show plate 120 in its collapsed position 120*a*). Plate 120 may spring back to its initial (e.g., non-collapsed) position when the force is released (e.g., FIGS. 1A, 1B show plate 120 in its initial non-collapsed position 120*a*). For example, when a network interface device is inserted into frame interior 118 from first frame 111 in longitudinal direction 113 towards second frame end 112, the network interface device may apply a force on plate 120 and cause plate 120 to collapse towards first frame surface 114 (e.g., as shown in FIGS. 1C, ID). When the network interface device is removed from frame interior 118, plate 120 may spring or be biased to its initial non-collapsed position (e.g., initial non-collapsed position 120*a* as shown in FIGS. 1A, 1B). When in the initial non-collapsed position (e.g., as shown in FIGS. 1A, 1B), plate 120 may resist to the flow of air through frame interior 118 in the same (or substantially the same) measure as would a network interface device resist if the network interface device would be disposed within frame interior 118.

As described hereinabove, the length of plate 120 may be greater than the distance between first frame surface 114 and second frame surface 115 and/or angle 124 of plate 120 relative to first frame surface may be smaller than 90 degrees (e.g., angle 124 may be 30 degrees). Having plate 120 disposed at angle 124 of less than 90 degrees relative to first frame surface 114 may, for example, prevent plate 120 from getting stuck with respect to frame 110 during rotation of plate 120 relative to first frame surface 114 (e.g., due to tolerances of frame 110 and plate 120). Plate 120 having length that is greater than the distance between first frame surface 114 and second frame surface 115 and/or having plate 120 disposed at angle 124 of less than 90 degrees relative to first frame surface 114 may, for example, ensure that plate 120 contacts second frame surface 115 at its free edge 122 (e.g., to enhance the reduction of the flow of air through frame interior 118 as described herein). In the example of FIGS. 1A-ID in which plate 120 and first frame surface 114 are formed of one piece of material, it may be advantageous to reduce angle 124 of plate 120 relative to first frame surface 114 (e.g., to 40, 30, 20 degrees or other suitable value) to reduce mechanical stresses that develop in the vicinity of base edge 121 of plate 120 during rotation of plate 120 relative to first frame surface 114. Reducing mechanical stresses in the vicinity of base edge 121 of plate 120 may be important to reduce the risk of plastic deformation of plate 120 and/or of first frame surface 114 as the plastic deformation may harm the resilience or springiness of plate 120.

In operation, when air is circulated through frame interior 118, for example from second frame end 112 towards first frame end 111, holes 123 on plate 120 may allow air to pass therethrough while reducing or limiting the flow of air through frame interior 118 (as compared to frame interior 118 that is not occupied with a network interface device and has no flow limiting plate 120) to cause air to flow through frame interior 118 at the same (or substantially the same) flowrate as would cause a network interface device if the network interface device would be disposed within frame interior 118.

Instead or in addition to holes 123, plate 120 may extend along a portion of the distance between third frame surface 116 and fourth frame surface 117 and/or free edge 122 of plate 120 may not contact second frame surface 115 such that one or more gaps, through which air may pass, may be formed between plate 120 and one or more surfaces of frame 110 when plate 120 is in the initial non-collapsed position. The number of holes 123 and/or dimensions of plate 120 and/or position of plate 120 within frame interior 118 may be predetermined to cause plate 120 to resist to the flow of air through frame interior 118 at the desired measure.

Figure 2:
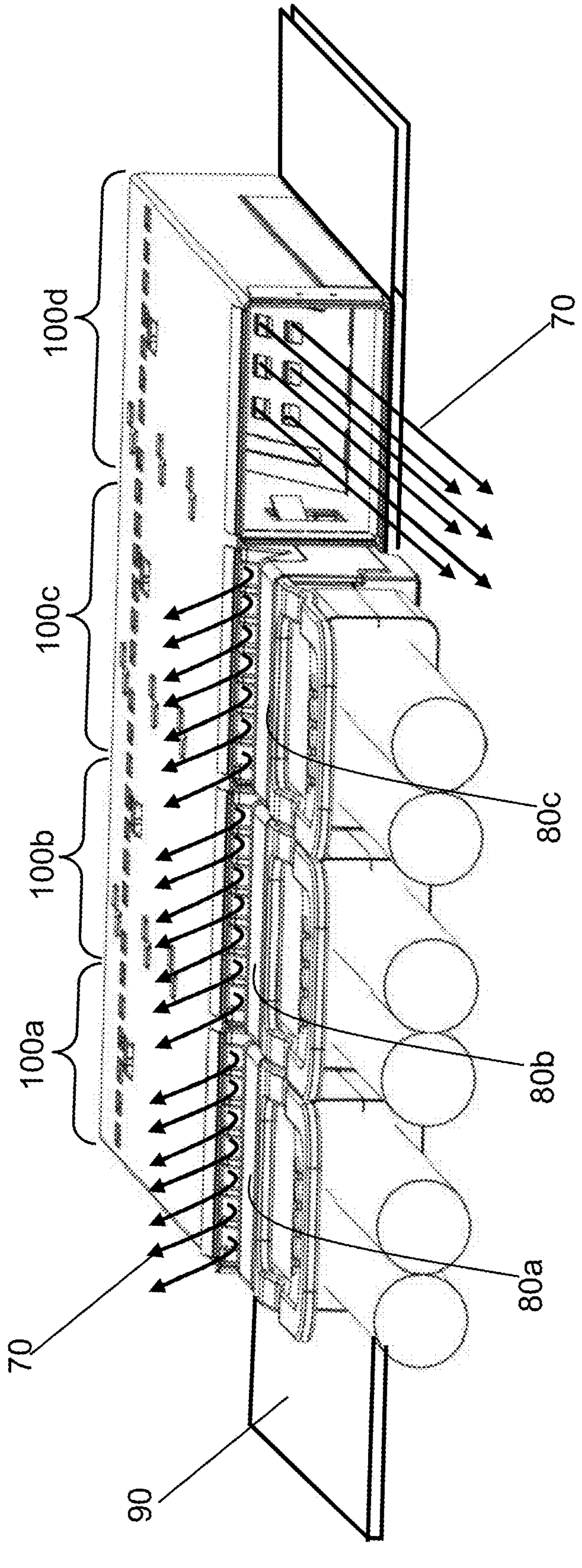
FIG. 2 is a 3D diagram of receptacle cages disposed on a printed circuit board of a network device, and of network interface devices each disposed within one of the receptacle cages, according to some embodiments of the invention.

Reference is made to FIG. 2, which is a 3D diagram of receptacle cages 100*a*, 100*b*, 100*c*, 100*d* disposed on a printed circuit board (PCB) 90 of a network device, and of network interface devices 80*a*, 80*b*, 80*c* each disposed within one of the receptacle cages, according to some embodiments of the invention.

In the example of FIG. 2, each of receptacle cages 100*a*, 100*b*, 100*c* is occupied by one of network interface devices 80*a*, 80*b*, 80*c* while receptacle cage 100*d* is unoccupied and remains empty. Plate 120 of unoccupied receptacle cage 100*d* is in the non-collapsed position. In order to remove heat generated by network interface devices 80*a*, 80*b*, 80*c* operating within receptacle cages 100*a*, 100*b*, 100*c*, air 70 is circulated through the frame interiors of receptacle cages 100*a*, 100*b*, 100*c*, 100*d*. Plate 120 of unoccupied receptacle cage 100*d* reduces or limits the flow of air through the frame interior of unoccupied receptacle cage 100*d* and causes air to flow through the frame interior of unoccupied receptacle cage 100*d* at the same (or substantially the same) flowrate as would cause a network interface device if the network interface device would be disposed within the frame interior thereof (e.g., as described hereinabove). As a result, air flows through each of occupied receptacle cages 100*a*, 100*b*, 100*c* and unoccupied receptacle cage 100*d* at the same (or substantially the same) flowrate thus ensuring that heat generated by network interface devices 80*a*, 80*b*, 80*c* operating within occupied receptacle cages 100*a*, 100*b*, 100*c* is removed by the flow of air at the same (or substantially the same) desired rate.

Figure 3:
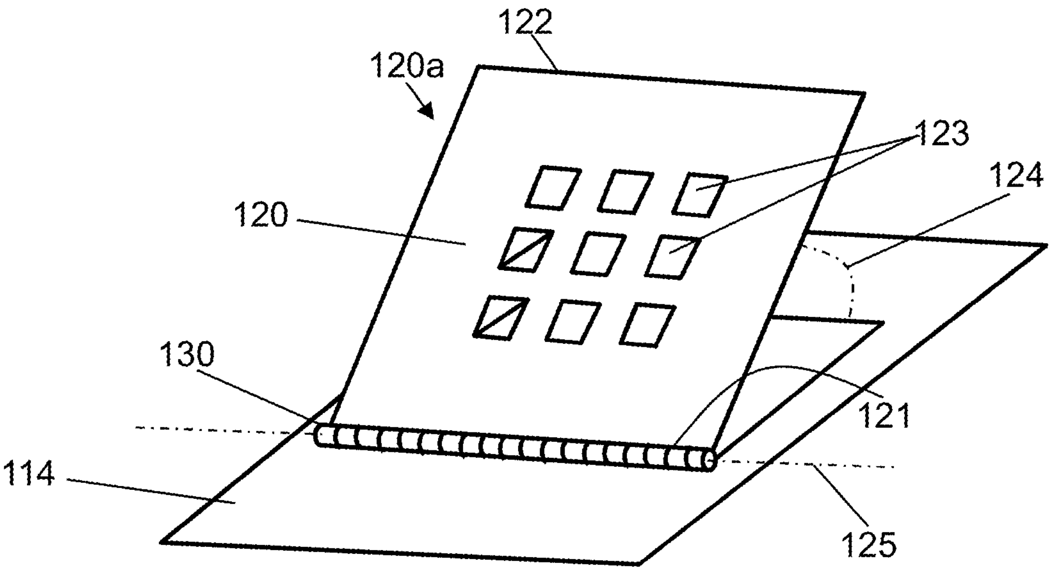
FIG. 3 is a schematic illustration of a first frame surface of a frame of the receptacle cage and of a plate coupled to the first frame surface using a spring hinge, according to some embodiments of the invention.

Reference is made to FIG. 3, which is a schematic illustration of first frame surface 114 of frame 110 of receptacle cage 100 and of plate 120 coupled to first frame surface using a hinge or coupling device such as a spring hinge 130, according to some embodiments of the invention.

Plate 120 and first frame surface 114 of frame 110 or receptacle cage 100 may be formed of different pieces of material. In the example of FIG. 3, plate 120 is coupled at its base edge 121 to first frame surface 114 using a spring hinge 130. Spring hinge 130 may coincide with axis 125 about which plate 120 may rotate with respect to first frame surface 114. Spring hinge 130 may hold plate 120 with respect to first frame surface 114 in the initial non-collapsed position 120*a* if no force is applied on plate 120. When a longitudinal force is applied on plate 120, spring hinge 130 may allow plate 120 to rotate about axis 125 and collapse towards first frame surface 114. When the force is released, spring hinge 130 may spring or move plate 120 back to the initial non-collapsed position 120*a*. Devices other than spring hinge 130 may be used to couple plate 120 to first frame surface 114, and to rotate or bias plate towards a certain position.

Unlike in prior art receptacle cage that needs to be covered at its open end with dedicated cover device when not occupied by a network interface device, the disclosed receptacle cage 100 includes plate 120 integrated within frame interior 118 of receptacle cage 100 to limit or reduce the flow of air through frame interior 118 of receptacle cage 100 when frame interior 118 is not occupied by a network interface device. Embodiments of the present invention eliminate a need in dedicated covers for receptacle cages and thus simplify and improve handling of empty receptacle cages that are not occupied by network interface devices in the operating network device.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A receptacle cage comprising:

a frame comprising: a first frame end, a second frame end, a frame interior, a first frame surface and a second frame surface opposed to the first frame surface; and a plate comprising a plurality of holes formed therethrough and projecting from the first frame surface into the frame interior towards the second frame surface, wherein the plate is configured to collapse towards the first frame surface when a force is applied on the plate in a longitudinal direction extending from the first frame end towards the second frame end, and wherein the plate springs back into its initial position after the force is released.

2. The receptacle cage of claim 1, wherein the plate is inclined at an angle less than 90 degrees relative to the first frame surface in a longitudinal direction extending from the first frame end towards the second frame end.

3. The receptacle cage of claim 1, wherein the plate extends between a third frame surface and a fourth frame surface that is opposed to the third frame surface.

4. The receptacle cage of claim 1, wherein a free edge of the plate contacts the second frame surface.

5. The receptacle cage of claim 1, wherein the plate and the first frame surface are formed of one piece of material.

6. The receptacle cage of claim 1, comprising a spring hinge that couples a base edge of the plate to the first frame surface.

7. The receptacle cage of claim 1, wherein the receptacle cage is configured to be disposed on a printed circuit board such that the first frame surface faces the printed circuit board.

8. The receptacle cage of claim 1, wherein:

the frame interior is configured to accommodate a network interface device; and the plurality holes are configured to allow air to pass through the plate when the plate has not collapsed towards the first frame surface while limiting a flow of the air through the frame interior, such that, when the plate has not collapsed towards the first frame surface, air flows through the frame interior at a flowrate that is substantially the same as a flowrate that would occur if the network interface device were disposed within the frame interior.

9. A receptacle cage comprising:

a frame comprising: a first frame end, a second frame end, a frame interior, a first frame surface, a second frame surface opposed to the first frame surface, a third frame surface and a fourth frame surface opposed to the third frame surface; and a plate comprising a plurality of holes formed therethrough and coupled to the first frame surface and rotatable with respect to the first frame surface about an axis extending between the third frame surface and the fourth frame surface, the plate extending from the first frame surface into the frame interior towards the second frame surface, wherein the plate is configured to collapse towards the first frame surface when a force is applied on the plate in a longitudinal direction extending from the first frame end towards the second frame end, and wherein the plate springs back into its initial position after the force is released.

10. The receptacle cage of claim 9, wherein the plate is inclined with respect to the first frame surface at an angle less than 90 degrees in the longitudinal direction extending between the first frame end and the second frame end.

11. The receptacle cage of claim 9, wherein the plate contacts, at its free edge, the second frame surface.

12. The receptacle cage of claim 9, wherein the plate extends between the third frame surface and the fourth frame surface.

13. The receptacle cage of claim 9, wherein the plate and the first frame surface are formed of one piece of material.

14. The receptacle cage of claim 9, comprising a spring hinge that couples the plate to the first frame surface.

15. A receptacle cage comprising:

a frame comprising: a first frame end, a second frame end, a frame interior, a first frame surface, a second frame surface opposed to the first frame surface, a third frame surface and a fourth frame surface opposed to the third frame surface; and a collapsible plate comprising a plurality of holes formed therethrough and coupled to the first frame surface and extending from the first frame surface into the frame interior towards the second frame surface;

wherein the collapsible plate is configured to collapse towards the first frame surface when a force is applied on the collapsible plate in a longitudinal direction extending from the first frame end towards the second frame end, and wherein the collapsible plate springs back to its initial position when the force is released.

16. The receptacle cage of claim 15, wherein the collapsible plate extends between the third frame surface and the fourth frame surface and contacts, at its free edge, the second frame surface.

17. The receptacle cage of claim 15, wherein the collapsible plate and the first frame surface are formed of one piece of material.

* * * * *